R. H. COWDERY.
CULTIVATOR.
APPLICATION FILED FEB. 27, 1919.
1,316,878.
Patented Sept. 23, 1919.
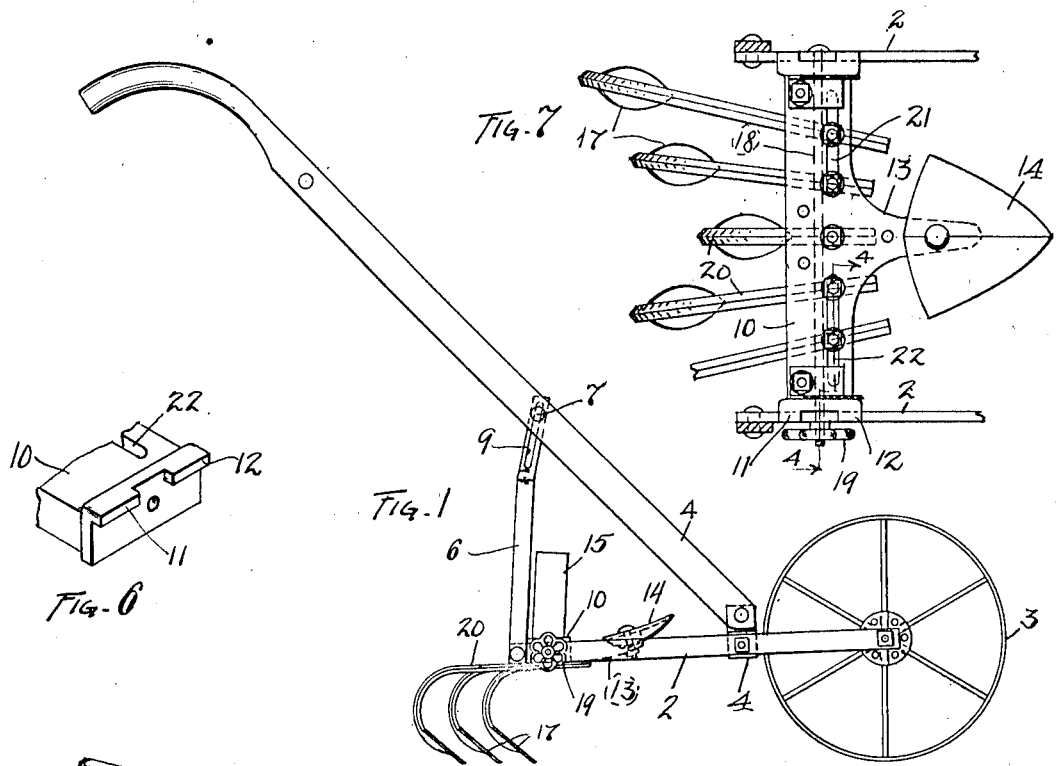
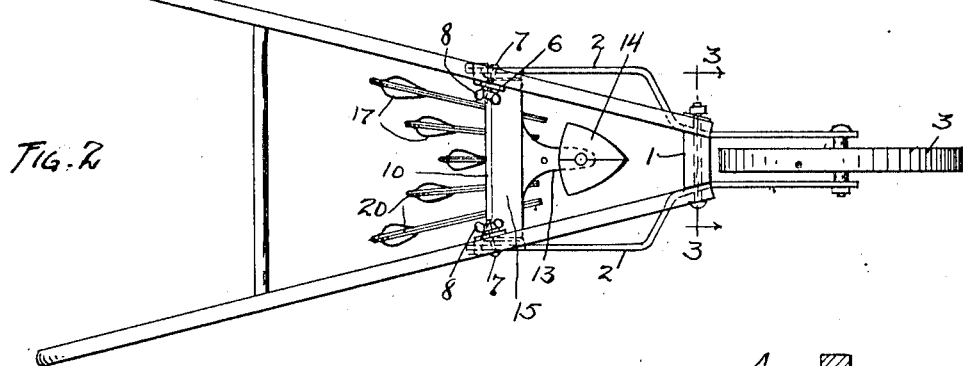
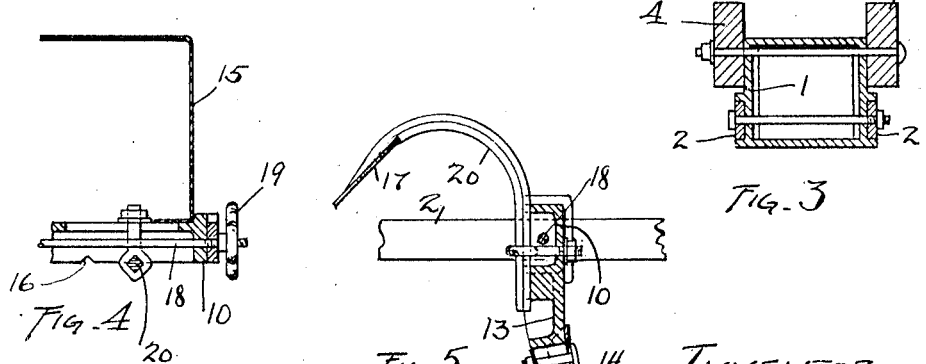
INVENTOR
Robert H. Cowdery
By Day, Oberlin & Day
ATTORNEYS.

UNITED STATES PATENT OFFICE.

ROBERT H. COWDERY, OF GENEVA, OHIO, ASSIGNOR TO THE AMERICAN FORK & HOE COMPANY, OF CLEVELAND, OHIO, A CORPORATION OF OHIO.

CULTIVATOR.

1,316,878.     Specification of Letters Patent.    Patented Sept. 23, 1919.

Application filed February 27, 1919. Serial No. 279,619.

*To all whom it may concern:*

Be it known that I, ROBERT H. COWDERY, a citizen of the United States, and a resident of Geneva, county of Ashtabula, and State of Ohio, have invented a new and useful Improvement in Cultivators, of which the following is a specification, the principle of the invention being herein explained and the best mode in which I have contemplated applying that principle, so as to distinguish it from other inventions.

The present improvements, relating, as indicated, to cultivators, are more particularly concerned with an improved mechanism for use in connection with a cultivator of the type in which two or more tools are mounted in the mechanism at the same time and are capable of successive use by being brought into an operative position below the frame of the device. Cultivators of this type have long been known, but have never come into extensive use, as no readily adjustable means have been provided for removing one tool and bringing another into an operative position, and my invention provides for a very simple and convenient means for accomplishing this purpose. Further objects of the invention are the provision of an adjustable handle mechanism and a more convenient and simple construction and general arrangement of parts. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a side elevation of my improved cultivator; Fig. 2 is a plan view of the same; Fig. 3 is a section on the line 3—3, Fig. 2; Fig. 4 is a section on the line 4—4, Fig. 1; Fig. 5 is a transverse section through the tool holder; Fig. 6 is a partial view in perspective of the toolholder, showing one end only; and Fig. 7 is an enlarged partial plan view showing the tool holder and its mounting in the frame.

In Fig. 2 the entire cultivator is shown and will be seen to consist of a frame consisting of two spaced members 2, between the forward ends of which is mounted a single wheel 3. Just rearward of the wheel 3 there is mounted between the members 2 a spacer or support 1, to which are pivotally attached the forward lower ends of handles 4. The handles are also attached intermediate their ends to vertical supports 6, which are mounted on the rear ends of the frame, and this attachment is an adjustable one secured by the use of bolts 7 and wing nuts 8 on the handles operated in slots in the support 6, so that the height of the upper ends of the handles may be varied to suit the individual user throughout a considerable range.

The rear ends of the frame members 2 are not braced together and are somewhat resilient so that they may be sprung slightly out of their normal position when necessary without the use of any great amount of force to receive therebetween a tool holder in the form of a plate or bar 10, which is provided at either end with outwardly extending lugs or flanges 11 and 12. In the position of the tool holder shown in Fig. 1 these flanges bear against the upper edge of the frame members 2 at spaced points, and serve to rigidly secure the plate 10 between the frame members 2. The flanges or lugs 11 and 12 are so spaced that if the plate is turned through an angle of 90 degrees in either direction these lugs engage against the top and bottom of the frame members, and upon turning the plate through 180 degrees they both engage against the lower edge of the members 2. Thus, in any of the positions named the tool holder is rigidly secured to the frame members and has a bearing thereon at two spaced points.

At one side the plate is provided with an extension 13, to which is attached a small plow blade 14, while to the upper surface of the plate there is attached a hoe member 15, shown in a vertical position in Figs. 1 and 4. The lower surface of the plate when in the same position is provided with two corresponding series of recesses or notches 16, in which there may be set in different relations a series of cultivator teeth which may conveniently be arranged in the manner shown in Figs. 1 and 7. As will be seen from Fig. 5 the plate is formed hollow and thus the two series of notches in the two lower edges form two points of support for each of several cultivator teeth 17, and hold these teeth in a rigid relation to the plate.

Passing longitudinally through the hollow interior of the plate is an adjusting bar or rod 18 which passes through suitable openings in the vertical supports 6 and carries at one end an adjusting hand wheel 19. In Fig. 4 I have shown a convenient means for securing the cultivator teeth in position which consist of an eye-bolt having an eye formed to snugly engage over the square shanks 20 of the cultivator teeth and passing upwardly through slots 21 and 22 in the plate where the eye-bolt is secured by suitable nuts and washers.

When it is desired to change from the cultivator teeth which are shown in the operative position in Fig. 1, to the plow, for example, it is only necessary to loosen the hand wheel 19, spring the frame members 2 and supports 6 slightly away from each other, and then rotate the plate through a quarter turn. This brings the plow into operative position and the flanges 11 and 12 into position above and below the edges of the frame members 2. These members are then allowed to snap back into a position between the flanges and the hand wheel is tightened to secure the plate in this position. By a similar action the plow is swung into an operative position and the hoe is brought down into a position for operation.

In such a cultivator rigidity during use and ease of adjustment are essential and these qualities are secured by the construction just described. The adjustment is quite simple to make and yet the tools are held firmly in the frame for use. The vertically adjustable handles make it possible to fit the tool to the individual user and also to the work to be done, while handles, frame members and tools are rigidly secured together by the spacer adjacent to the wheel and by the rod through the tool holder.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a cultivator, the combination of a frame having two spaced yieldable elements therein, a tool-receiving plate disposed between said elements and provided with members for interlocking with said elements, a rod extending through said plate and said elements, means coöperating with said rod, said means being adapted to draw said elements together along said rod and lock said plate therebetween.

2. In a cultivator, the combination of a frame having two spaced yieldable elements therein, handles attached to said frame, a tool-receiving plate disposed between said elements and provided with members for interlocking with said elements, means adapted to spread or clamp together said two spaced elements to release or lock said tool-receiving plate, and braces for said handles attached to said spaced elements, said braces being yieldable therewith during adjustment of said tool-receiving plate.

3. In a cultivator, the combination of a frame having two spaced yieldable elements therein, a tool-receiving plate disposed between said elements and provided with members for interlocking with said elements in each of several relations, a rod extending through said plate and said elements, means coöperating with said rod, said means being adapted to draw said elements together along said rod and lock said plate therebetween.

Signed by me this 21st day of February, 1919.

ROBERT H. COWDERY.